J. KIURU.
ANIMAL RELEASING DEVICE.
APPLICATION FILED AUG. 21, 1918.
1,299,193.
Patented Apr. 1, 1919.
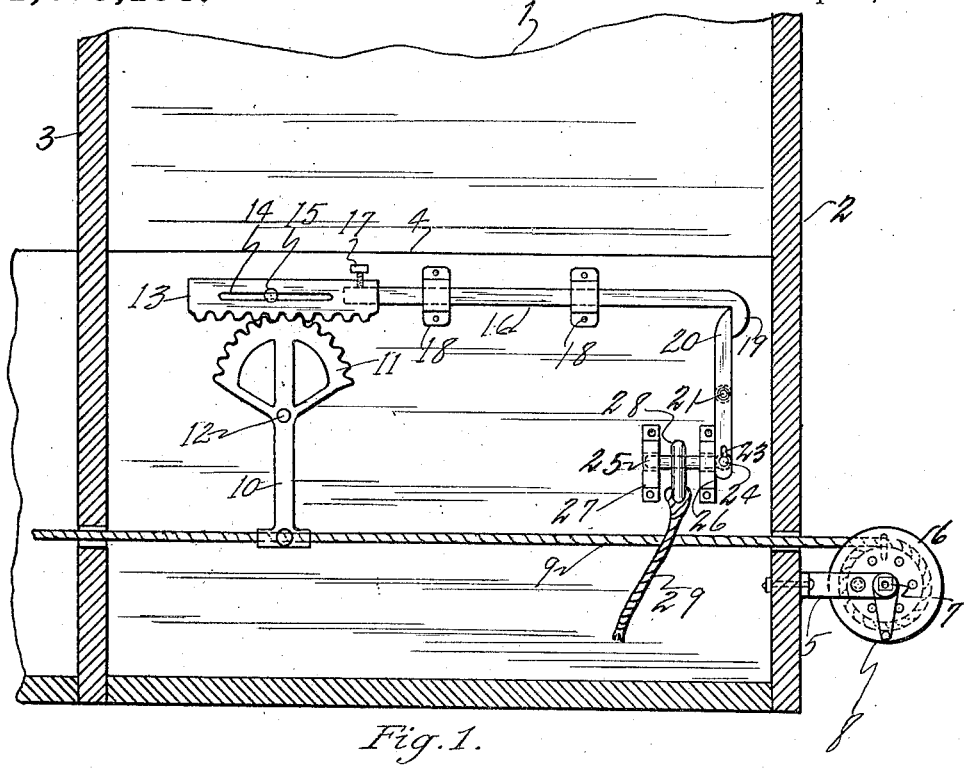
Fig. 1.
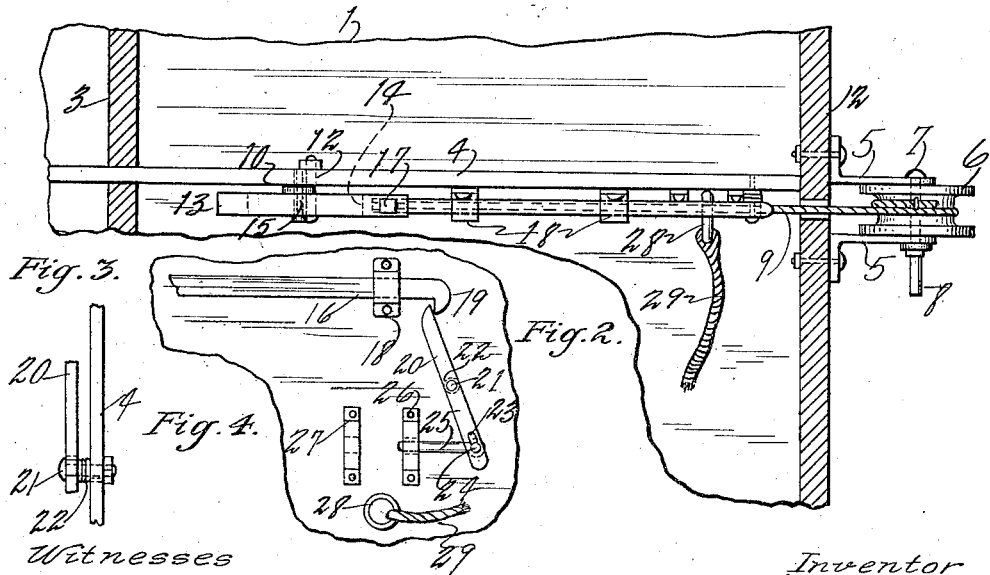
Fig. 3.
Fig. 4.
Fig. 2.
Witnesses
Inventor
J. Kiuru
By
Atty.

UNITED STATES PATENT OFFICE.

JOHN KIURU, OF FAIRBURN, SOUTH DAKOTA.

ANIMAL-RELEASING DEVICE.

1,299,193.   Specification of Letters Patent.   Patented Apr. 1, 1919.

Application filed August 21, 1918.  Serial No. 250,799.

*To all whom it may concern:*

Be it known that I, JOHN KIURU, a citizen of Finland, Russia, residing at Fairburn, in the county of Custer and State of South Dakota, have invented certain new and useful Improvements in Animal-Releasing Devices, of which the following is a specification.

This invention relates to improvements in animal releasing devices and its chief object is to provide means for normally holding a number of animals in a series of stalls in a stable and for releasing them simultaneously in time of emergency. A further object is to provide a device of this type that is simple in construction and arrangement of parts, cheap to manufacture and efficient in operation. With the foregoing and other objects in view the invention consists in the combination and arrangement of parts to be hereinafter fully described, pointed out in the appended claims and illustrated in the accompanying drawing which forms a part of this specification and in which—

Figure 1 is a view of my improved device in front elevation illustrating its application.

Fig. 2 is a top plan view of Fig. 1.

Fig. 3 is a fragmentary view illustrating the spring fulcrum employed.

Fig. 4 is a fragmentary view of the device illustrating the open position of the same.

Like reference characters denote corresponding parts throughout the several views.

The reference numeral 1 denotes a stable having one end wall 2, the interior partitions 3 to form the stalls and the manger wall 4. To the outer surface of the end wall 2 I secure the brackets 5 wherein the rotary drum 6 is supported upon the axis 7 provided with the operating handle 8. To the drum one end of the rope 9 is secured, said rope passing through a suitable perforation in the end wall 2 and through perforations in the several partitions 3. To the rope 9, in each stall, the lower end or extension 10 of a toothed segment 11 is secured, said extension 10 being pivotally secured by the pin 12 to the manger wall, said segment 11 being in mesh with the sliding rack 13 which is formed with the elongated slot 14 through which the pin 15 extends that operatively supports said rack. One end of the rack 13 is formed with a socket to receive one end of the sliding bar 16, said bar and rack being secured together with the set screws 17, said bar being operatively supported in the brackets 18 secured to the manger wall 4, said bar 16, further, being formed with one downturned extremity or head 19 for engagement with the lever 20 fulcrumed upon a pin 21, carried by the wall 4, said lever being engaged by one end of a spring 22 encircling said pin, the other end of said spring being secured to the said wall 4. The purpose of said spring 22 is to retain one end of the lever 20 in positive engagement with the bar-head 19. In one end of the lever 20 the elongated slot 23 is formed through which the transverse head 24 of link 25 extends, said link normally slidably engaging both of the brackets 26, 27 which are secured to the manger wall 4. The hitching ring 28 carrying the halter rope 29 is retained upon the link 25 in the normal position of the same, the said rope 29 serving to hold one animal in one of the stalls of the stable.

To release any animal in any one stall it is but necessary to manually move the one end of lever 20 out of engagement with the bar-head 19 thus causing the opposite end of said lever to retract the link 25 into the position illustrated in Fig. 4 and drop the ring 28. To release all of the animals at the same time the operator may rotate the drum 6 thus winding the rope 9 upon the same, said rope rocking the several segments 11 upon pivots 12 thus moving the racks 13 in a direction away from the wall 2 and so retracting the bars 16 which will move the levers 20 and links 25 into the position shown in Fig. 4, or open position, and so drop the several rings 28 thus freeing the animals. It is intended that the rope 9 shall carry a suitable weight (not shown) at its end remote from the drum 6 to take up slack. The device is reassembled by the operator re-positioning the several rings 28 upon the several links 25.

What is claimed is:—

1. In an animal releasing device, a pull rope, pivotally supported segments operatively connected to said pull rope, sliding racks in mesh with said segments, sliding bars connected to and movable with said sliding racks, sliding links, connection between said links and said sliding bars for transmitting motion from the latter to said links, and means for yieldingly retaining said connection in a predetermined position.

2. In an animal releasing device, a pull rope, pivotally supported segments operatively connected to said pull rope, sliding racks in mesh with said segments, sliding bars connected to and movable with said sliding racks, said sliding bars being formed with bent heads, sliding links, pivotally supported levers connected to said links and extending to said bar-heads, and means for yieldingly retaining said levers and bar-heads in positive engagement.

In testimony that I claim the foregoing as my own I have hereto affixed my signature in the presence of two subscribing witnesses.

JOHN KIURU.

Witnesses:
H. J. SANDERS,
J. H. REINSHAGER.

Copies of this patent may be obtained for five cents each, by addressing the "Commissioner of Patents, Washington, D. C."